United States Patent [19]

Burgdorf et al.

[11] Patent Number: 4,802,710
[45] Date of Patent: Feb. 7, 1989

[54] ELECTRIC SWITCHING DEVICE

[75] Inventors: Jochen Burgdorf, Offenbach-Rumpenheim; Franz Latka, Niddatal, both of Fed. Rep. of Germany

[73] Assignee: Alfred Teves GmbH, Frankfurt am Main, Fed. Rep. of Germany

[21] Appl. No.: 112,190

[22] Filed: Oct. 20, 1987

[30] Foreign Application Priority Data

Oct. 24, 1986 [DE] Fed. Rep. of Germany ....... 3636263

[51] Int. Cl.4 .................. B60T 11/18; B60T 17/22
[52] U.S. Cl. .................................. 303/11; 303/110; 303/92
[58] Field of Search ............. 303/111, 92, 11, 116, 303/95, 96, 99, 97, 110, 103; 364/426

[56] References Cited

U.S. PATENT DOCUMENTS 4,699,435 10/1987 Wupper ..................... 303/65
4,728,156 3/1988 Burgdorf et al. ............ 303/92

FOREIGN PATENT DOCUMENTS 3443880 6/1985 Fed. Rep. of Germany .
3430096 2/1986 Fed. Rep. of Germany .
3444458 6/1986 Fed. Rep. of Germany ........ 303/65

Primary Examiner—Andres Kashnikow
Assistant Examiner—Mark T. Le
Attorney, Agent, or Firm—James B. Raden

[57] ABSTRACT

Disclosed is an electric switching device for monitoring the operation of a hydraulic brake system for automotive vehicles of the type including a brake slip control device. The electric switching device includes a first switch for switching the brake slip control device on and off, a second switch operating a warning lamp, a third switch for controlling a hydraulic pressure pump and a pressure responsive actuating element for actuating the switches dependent on the state of pressure on the brake system. Improved reliability is provided for by including functional redundancy of the first switch into the circuitry including a diode connecting a make type first switch to a break type second switch whereupon the brake slip controller circuit is grounded upon a fault condition in the controller circuit to prevent false signals from reaching the controller.

2 Claims, 1 Drawing Sheet

4,802,710

ELECTRIC SWITCHING DEVICE

BACKGROUND OF THE INVENTION

This invention relates to an electric switching device for monitoring the operation of a hydraulic brake system for automotive vehicles, which brake system is the type equipped with a brake slip control device. The electric switching device includes a first switch which switches the brake slip control device on and off, a second switch for operating a warning lamp, and third switch for controlling a hydraulic pressure pump, and an actuating element which actuates the switches and which is pressurizable by hydraulic pressure.

Typically, a pressure medium pump is used to supply hydraulic brake systems of automotive vehicles with pressure medium so as to enable the braking force to be boosted and the brake slip control device to be operated. In such a system the pressure medium pump typically charges a pressure accumulator from which the pressure medium is tapped through a controlled valve when the need arises. In other systems, the pressure medium is delivered directly into the brake system with the pump drive being switched on only in case of need, for example, at the onset of brake slip control.

Electrohydraulic switching devices, also called pressure and alarm switches, are used for monitoring the operation of such hydraulic brake systems.

SUMMARY OF THE INVENTION

It is an object of the present invention to provide for an electric switching device for use in a brake system having slip control of the type referred to which has high operational reliability.

According to the invention, this object is achieved in that a first switch which turns the slip control device on and off is a make contact type and circuit means providing for functional redundancy of the first switch is provided for by connecting the first switch to a second switch of the device which is a break contact type.

According to an important aspect of the invention the circuit means providing for the functional redundancy is effected by means of two diodes, one connected between the first switch and the second switch in a forward direction and cooperating with a decoupling diode connected in a forward direction between the warning lamp to be operated and the second switch.

BRIEF DESCRIPTION OF THE DRAWING

Further details and advantages of the inventive switching device will become evident from the reading of the Detailed Description of the Preferred Embodiment of the invention in conjunction with the accompanying drawing in which.

DETAILED DESCRIPTION OF THE PREFERRED EMBODIMENT

Figure 1:
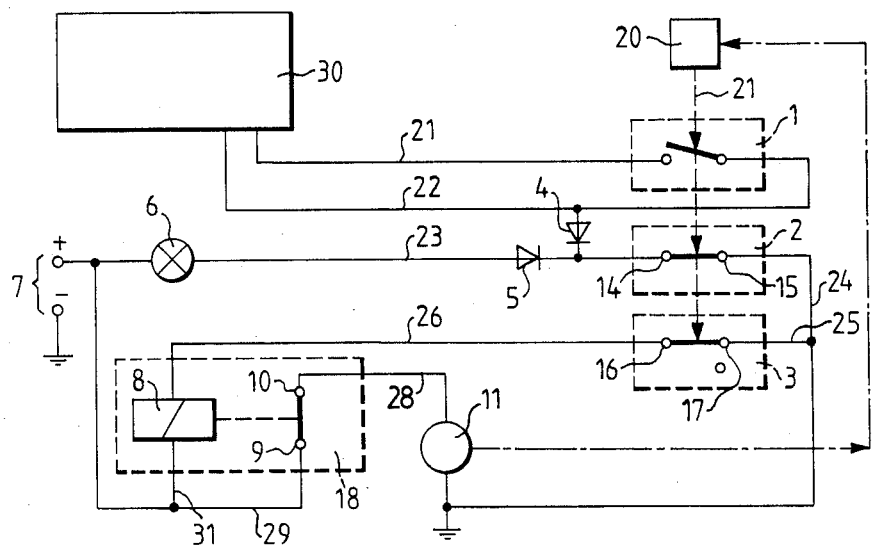
FIG. 1 is a schematic diagram of the electric switching device according to the invention, with the switching device shown in the rest position.

In the drawing, the reference numeral 1 designates a first switch designed as a make contact switch. Two lines 21, 22, connect the contacts 12, 13 of the switch 1 with an electronic control unit 30 of a brake slip control device, not shown in the drawing. The connection between the switch 1 and the controller 30 defines a "closed loop circuit". The function of the first switch 1 is to put the brake slip control device in or out of operation in accordance with predeterminable pressure valves of the pressure prevailing in the hydraulic system. A connection between the circuit including the first switch 1 and a second switch 2 is provided for by a diode 4. A decoupling diode 5 is connected between the second switch 2 and a warning lamp 6. The function of the decoupling diode 5 is explained in more detail below in connection with the mode of operation of the inventive switching device. The second switch 2, which is a break contact design is connected with a warning lamp 6 by a line 23, on the one hand, and with the negative pole of an operating voltage source 7 by a line 23, on the other hand. The optical signal generated by the warning lamp 6 indicates a pressure drop in the hydraulic brake system.

In addition to the two switches 1 and 2, a third switch 3 is provided. Third switch 3 is designed as a break contact switch whose contacts 16 and 17 are connected with the excitation winding 8 of a pump relay 18 by means of a line 26 and with the negative pole of the operating voltage source 7 by means of line 24 which is connected by means of a connection line 25. The other end of the excitation winding 8 of the pump relay 18 is connected with a line 29 by a connection line 31. The line 29 connects the positive pole of the operating voltage source 7 with a first contact 9 of two operating contacts 9, 10 of the pump relay 18. The other, second, operating contact 10 is connected by a line 28 with a motor 11 which drives a hydraulic pump 20 by means of which the hydraulic pressure in the brake system can be increased or held on a certain level, respectively. An actuating element 19 which is pressurizable by means of the hydrualic pressure, is connected to and actuates the three above-mentioned switches 1,2, 3 dependent on the system pressure.

The mode of operation of the above-described switching device according to the invention is as follows:

With the hydraulic brake system in a pressureless condition, and with the switching device connected to the operating voltage, for example by the ignition key, the individual switching elements assume a first, rest, position as shown in FIG. 1. In the first position, which as stated corresponds to a pressure of zero acting on the actuating element 19, the contacts 12, 13 of the first switch 1 are open, thus the brake slip control device is switched off. The warning lamp 6 which is connected in series with the contacts 14 and 15 of the second switch 2, however, is supplied with current, lights and thereby reports that the pressure in the hydraulic system is low. The third switch 3 is also closed in the first position and accordingly closes the electric circuit of the pump relay 18. Thus a current flows through the excitation winding 8 of the pump relay 18 and effects operation of the pump relay 18 so that the motor 11 drives the pressure pump 20 and the hydraulic pressure in the system is accordingly gradually increased. As the pressure increases, the actuating element 19 moves as indicated by the arrow in FIG. 1 and actuates the three switches.

Figure 2:
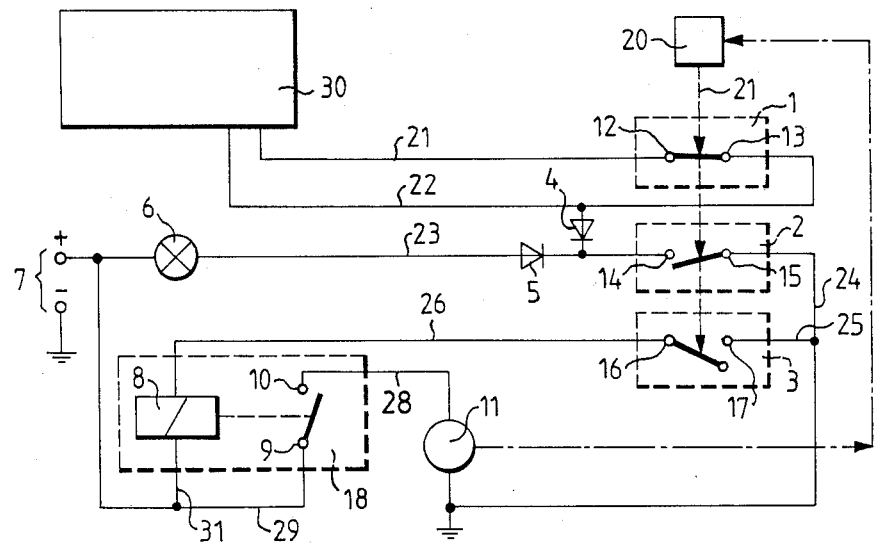
FIG. 2 is a schematic diagram of the electric switching device of FIG. 1, with the hydraulic brake system in an operating condition.

Upon an upper threshold value of pressure being reached, all of the switching elements assume a second position as illustrated in FIG. 2. Due to the closure of the first switch 1, the brake slip control device is connected, whereas the switch 2 opens and the warning lamp 6 goes out. Subsequently, the third switch 3, which controls the pump relay 18, opens interrupting the pump relay circuit. The pump relay 18 drops out thus switching off the motor 11 from driving the hydraulic pressure pump 20.

Should a defect occur in the first closed loop circuit, which, as mentioned, includes the electronic control unit 30, the lines 21 and 22 and the first switch 1, such as a short circuit at the first switch 1 or in the cable or should the first switch 1 be "sticking" and not interrupt the circuit despite a pressure drop in the hydraulic system, reliable switching-off of the brake slip control device will still be effected by the inventive device because the potential on the closed loop is grounded through the diode 4 and the second switch 2 which has closed due to the drop in pressure. As a result, the electronic control unit 30 does not receive any signal which could be interpreted by the controller as a signal representing the existence of sufficient hydraulic pressure in the system.

What is claimed is:

1. An electric switching device for monitoring the operation of a hydraulic brake system for an automotive vehicle equipped with a brake slip control device, said electric switching device comprising first switch means adapted to switch the brake slip control device on and off, second switch means for operating a warning lamp, third switch means for controlling a hydraulic pressure pump, a brake system pressure responsive actuating element connected to said first, second, and third switch means, said first switch means including means to make contact through said switch, said second switch means including means to break contact through said switch, and circuit means providing for functional redundancy of said first switch means including means electrically connecting said first switch means to said second switch means to maintain said brake slip control device in a switched off position in the event said first switch remains in a switched on position and pressure in said hydraulic brake system remains below a threshold value.

2. The electric switching device as claimed in claim 1 wherein said circuit means includes two diodes, a first diode connected to and between said first switch means and said second switch means to permit current to flow from said first circuit to a ground potential when said first switch is closed and said pressure in said hydraulic brake system is below said threshold value, said first diode cooperating with the second diode which is connected between the warning lamp and the second switch means to prevent current from passing to said warning lamp when said pressure in said hydraulic brake system is below said threshold value.

* * * * *